(12) United States Patent
Suzuki et al.

(10) Patent No.: US 6,809,438 B2
(45) Date of Patent: Oct. 26, 2004

(54) PERMANENT MAGNET STEPPING MOTOR HAVING POLE TEETH MISALIGNED BY AN ELECTRICAL ANGLE

(75) Inventors: Yuzuru Suzuki, Shizuoka-ken (JP); Taketoshi Ohyashiki, Shizuoka-ken (JP); Sakae Fujitani, Shizuoka-ken (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/159,724

(22) Filed: May 29, 2002

(65) Prior Publication Data

US 2002/0180282 A1 Dec. 5, 2002

(30) Foreign Application Priority Data

May 31, 2001 (JP) ..................................... 2001-163924

(51) Int. Cl.[7] ............................................. H02K 37/00
(52) U.S. Cl. ..................... 310/49 R; 310/257; 310/156
(58) Field of Search ............................ 310/49 R, 257, 310/156, 156.45

(56) References Cited

U.S. PATENT DOCUMENTS

| | | | | |
|---|---|---|---|---|
| 3,549,918 A | * | 12/1970 | Van Hout et al. | 310/49 R |
| 4,052,630 A | * | 10/1977 | Inariba | 310/162 |
| 4,099,106 A | * | 7/1978 | Nikaido | 318/115 |
| 4,414,942 A | * | 11/1983 | Itoh et al. | 123/339.26 |
| 4,794,292 A | * | 12/1988 | Torisawa | 310/257 |
| 5,032,747 A | * | 7/1991 | Sakamoto | 310/49 R |
| 5,132,603 A | * | 7/1992 | Yoshimoto | 318/696 |
| 5,291,084 A | * | 3/1994 | Shiotsuki et al. | 310/49 R |
| 5,386,161 A | * | 1/1995 | Sakamoto | 310/49 R |
| 5,818,143 A | * | 10/1998 | Suzuki et al. | 310/257 |
| 5,854,526 A | * | 12/1998 | Sakamoto | 310/254 |
| 5,962,947 A | * | 10/1999 | Suzuki et al. | 310/257 |
| 6,028,377 A | * | 2/2000 | Sakamoto | 310/49 R |
| 6,031,304 A | * | 2/2000 | Suzuki et al. | 310/49 R |
| 6,031,305 A | * | 2/2000 | Satoh et al. | 310/49 R |
| 6,060,800 A | * | 5/2000 | Suzuki et al. | 310/49 R |
| 6,153,953 A | * | 11/2000 | Isozaki et al. | 310/49 R |
| 6,191,509 B1 | * | 2/2001 | Yura et al. | 310/49 R |
| 6,265,838 B1 | * | 7/2001 | Won | 318/114 |
| 6,323,569 B1 | * | 11/2001 | Akama | 310/49 R |
| RE37,576 E | * | 3/2002 | Stephens et al. | 310/254 |
| 6,479,911 B1 | * | 11/2002 | Koike et al. | 310/49 R |
| 6,486,576 B1 | * | 11/2002 | Yura et al. | 310/49 R |
| 2001/0017493 A1 | * | 8/2001 | Sakamoto | 310/49 R |
| 2001/0048251 A1 | * | 12/2001 | Ieoka | 310/49 R |
| 2002/0047336 A1 | * | 4/2002 | Aoshima | 310/49 R |
| 2002/0180302 A1 | * | 12/2002 | Takayuki et al. | 310/257 |
| 2003/0193248 A1 | * | 10/2003 | Musashi | 310/49 R |

FOREIGN PATENT DOCUMENTS

| | | | | |
|---|---|---|---|---|
| JP | 01259748 | * | 10/1989 | H02K/37/14 |
| JP | 04244775 | * | 9/1992 | H02K/37/14 |
| JP | 06105526 | * | 4/1994 | H02K/37/14 |
| JP | 06225509 | * | 8/1994 | H02K/37/14 |

* cited by examiner

*Primary Examiner*—Dang Le
*Assistant Examiner*—Heba Yousri M. Elkassabgi
(74) *Attorney, Agent, or Firm*—Fay, Sharpe, Fagan, Minnich & McKee, LLP

(57) ABSTRACT

The stator assembly of a PM stepping motor having a two-phase structure in which two stators arranged along the circumferential direction in such a manner that respective pole teeth are intermeshed together are combined back to back so as to phase-shift the respective pole teeth in the two stators at an electrical angle of 90°. The field rotor magnet is so arranged as to face the respective pole teeth at a small distance, and is magnetized on its circumferential surface along the circumferential direction with a plurality of alternating N- and S-poles having a preset width not matching the pole tooth pitch of each stator.

10 Claims, 7 Drawing Sheets

PERMANENT MAGNET STEPPING MOTOR HAVING POLE TEETH MISALIGNED BY AN ELECTRICAL ANGLE

BACKGROUND OF THE INVENTION

1. Field of the Invention

The present invention relates to the structure of a permanent magnet stepping motor (which will be called a PM stepping motor hereinafter) and, more particularly, to the pole tooth layout of a stator and the magnetic pole layout of a field rotor magnet.

2. Description of the Prior Art

In recent years, there have been wider and wider applications of PM stepping motors as actuators for various devices because of their good controllability. Along with demands for higher performances of various devices, there are strong demands for quietness and reduction in vibrations.

However, the PM stepping motor moves stepwise with vibrations owing to its basic structure, and therefore cannot meet the demands for quietness and reduction in vibrations.

The high resolution (multi-steps) has been achieved with the improvement of control techniques such as a microstep technique. However, as described above, the motor itself moves stepwise. As a result, even if a width of every step is minimized by using the microstep technique, it is not possible to remove the stepwise motion from the motor, so that there is a limit to the improvement of rotation accuracy. This makes the control difficult, and for any device that requires precise control, various sensors are arranged on a DC motor to implement closed loop-control. However, the devices for this control are expensive, and cannot be used for low-cost, high-performance apparatuses which satisfy current demands.

In the PM stepping motor, the pole teeth of a stator are alternately and successively excited to the north and south poles by coil energization. In correspondence with this, a field rotor magnet which functions as a rotor rotates about the shaft. The output is the integral of the magnetic poles per rotation. If the pole tooth pitch of the stator and the magnetic pole width of the field magnet coincide with each other in the circumferential direction, like in a conventional structure, the magnetic coupling is improved to supply a maximum output, but the rotation becomes more stepwise with vibrations. When a back-electromotive force (B-EMF) generated by this rotation is subjected to FFT (Fast Fourier Transform), harmonic components, particularly third harmonic components grow with respect to the fundamental wave. Suppressing the growth of the third harmonic component can make the positional change of the rotor per unit time constant. The biggest problem is how to suppress the third harmonic components.

SUMMARY OF THE INVENTION

The present invention has been made to overcome the conventional drawbacks described above, and has for its object to provide a low-vibration, low-noise PM stepping motor with a simple structure suitable for a larger number of steps in which the rotation of a rotor is kept at a constant speed and the positional change of the rotor per step is stabilized.

To achieve the above object, according to the first aspect of the present invention, there is provided a PM stepping motor comprising: a stator assembly which is configured in a two-phase structure such that two stators, each having at its inner circumference a plurality of pole teeth in two arrays intermeshing with each other with a gap therebetween, are coupled together back to back with respective plurality of pole teeth misaligning by an electrical angle of 90 degrees; and a field rotor magnet which is arranged so as to oppose the respective plurality of pole teeth with a small air gap therebetween and which is magnetized circumferentially with a plurality of magnetic poles such that N- and S-poles, each having a predetermined width not matching a pitch of the pole teeth of each stator, are alternately disposed.

To achieve the above object, according to the second aspect of the present invention, there is provided a PM stepping motor defined in the first aspect, wherein the pitch of the pole teeth for one phase is calculated by a formula: {a one-cycle interval of magnetic poles $(360°/(p/2))\pm$ a half-cycle interval of third harmonics $(360°/(p/2)\times(1/6))$}/2, where p is a number of the magnetic poles with their width being constant, and wherein the pole teeth are arranged to be symmetrical about a center of the stator in such a manner that a pitch at two thereof opposing each other with respect to the center is different from the pitch at the other pole teeth than the two thereby performing pitch adjustment.

To achieve the above object, according to the third aspect of the present invention, there is provided a PM stepping motor defined in the first aspect, wherein the width of the magnetic poles for one phase is calculated by a formula: {a one-cycle interval of pole teeth $(360°/(n/2))\pm$ a half-cycle interval of third harmonics $(360°/(n/2)\times(1/6))$}/2, where n is a number of the poles teeth with their pitch being constant for one phase, and wherein the magnetic poles are arranged to be symmetrical about a center of the field rotor magnet in such a manner that one pair of N- and S-poles thereof opposing each other with respect to the center have a width different from the width of the other magnetic poles than the one pair, thereby performing width adjustment.

As is apparent from the first aspect, according to the present invention, it becomes possible to greatly reduce a third harmonic component which generates a cogging torque. As a result, the rotation settles at a constant speed, and the positional change of the rotor per step becomes stable. Therefore, the present invention can provide a low-vibration, low-noise PM stepping motor with a simple structure suitable for a larger number of steps that meets current demand.

As is apparent from the second aspect, according to the present invention, by the magnetic poles and pole teeth shifted from each other, third harmonics contained in magnetic fluxes linked between the field magnet of the field rotor magnet and the stator can be sequentially cancelled, thereby greatly decreasing generation of third harmonics. Therefore, the present invention can provide a high-controllability PM stepping motor reduced in cogging, vibrations, and noise.

As is apparent from the third aspect, according to the present invention, by the magnetic poles and pole teeth shifted from each other, third harmonics contained in magnetic fluxes linked between the stator and the field magnet can be sequentially cancelled, thereby greatly decreasing generation of third harmonics. Therefore, the present invention can provide a high-controllability PM stepping motor with reduced cogging, vibrations, and noise.

The above and many other objects, features and advantages of the present invention will become manifest to those skilled in the art upon making reference to the following detailed description and accompanying drawings in which preferred embodiments incorporating the principle of the present invention are shown by way of illustrative examples.

BRIEF DESCRIPTION OF THE DRAWINGS

FIGS. 4A to 4C show three types of stators used in the present invention, in which

FIGS. 5A and 5B show the magnetic pole layout of a field rotor magnet in a 20-step PM stepping motor, in which

FIGS. 7A and 7B are graphs showing the cogging torque characteristics of a stepping motor according to the present invention and a conventional one, in which

DETAILED DESCRIPTION OF THE PREFERRED EMBODIMENTS

Several preferred embodiments of the present invention will be described below with reference to the accompanying drawings.

Figure 1:
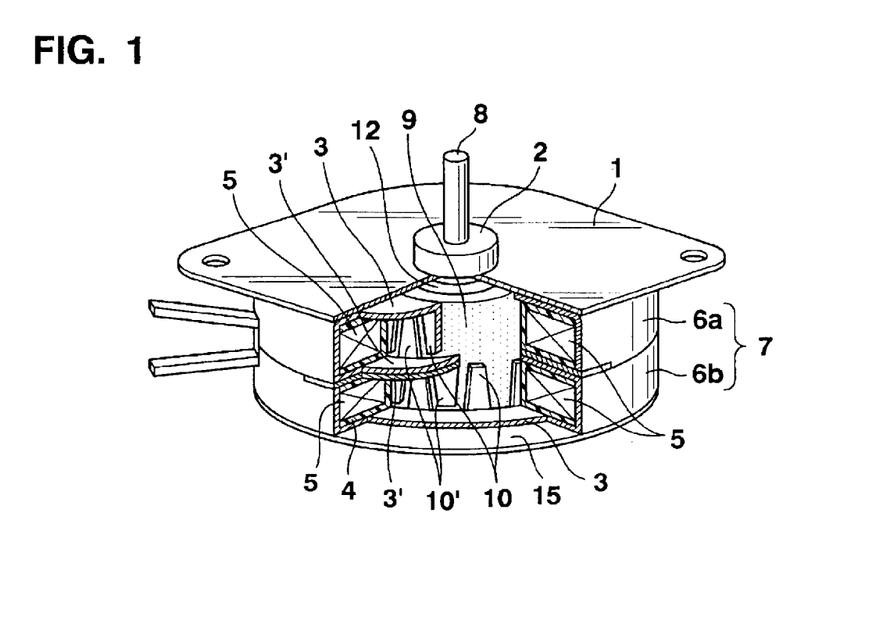
FIG. 1 is a partially cutaway perspective view showing the overall structure of a PM stepping motor according to the present invention.

In a PM stepping motor of the present invention shown in FIG. 1, reference numerals 1 and 15 denote flanges each of which is obtained by punching a stainless steel plate; 2, a bearing made of a porous bearing metal; 3 and 3', stator yokes each of which is manufactured by bending a soft magnetic steel plate into a three-dimensional doughnut shape and which has pole teeth 10 and 10'; 4, bobbins each of which holds a coil; 5, coils each constituted by winding a polyurethane copper wire or the like; 6a and 6b, stators each of which sandwiches the coil 5 between the two stator yokes 3 and 3'; 7, a stator assembly formed by combining the two stators 6a and 6b back to back; 8, a shaft serving as the center of rotation; 9, a field rotor magnet which faces the pole teeth 10 and 10' and has a plurality of magnetic poles (see FIGS. 5A and 5B) magnetized to a multipolar state on its external circumferential surface; and 12, a sleeve which clamps and holds the field rotor magnet 9 and the shaft 8.

Figure 2:
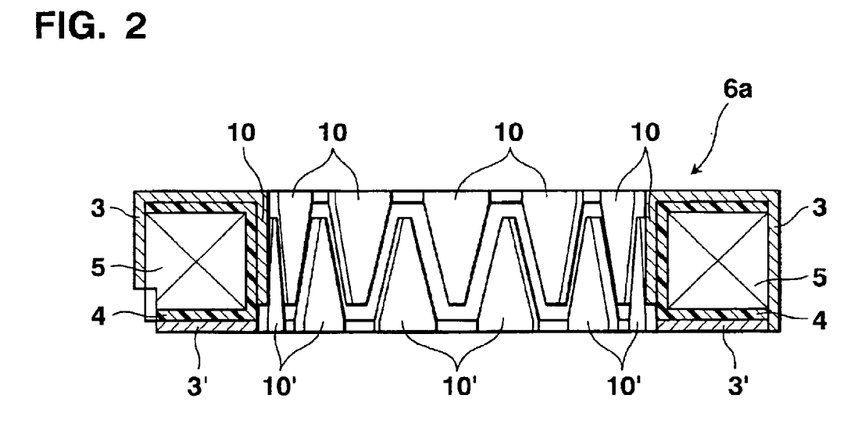
FIG. 2 is a longitudinal sectional view showing a stator.

As shown in FIG. 2, the stator 6a is made up of the doughnut-shaped stator yokes 3 and 3' which are coupled together along the periphery. When the stator yokes 3 and 3' are coupled together, the pole teeth 10 and 10' are intermeshed with each other with a gap therebetween. The bobbin 4 on which the coil 5 is wound is housed at the periphery of the stator 6a. The stator 6b (see FIG. 1) also has the same structure.

The stator assembly 7 (see FIG. 1) is formed by integrating the two stators 6a and 6b back to back by a method such as molding using a polymer material.

Figure 3:
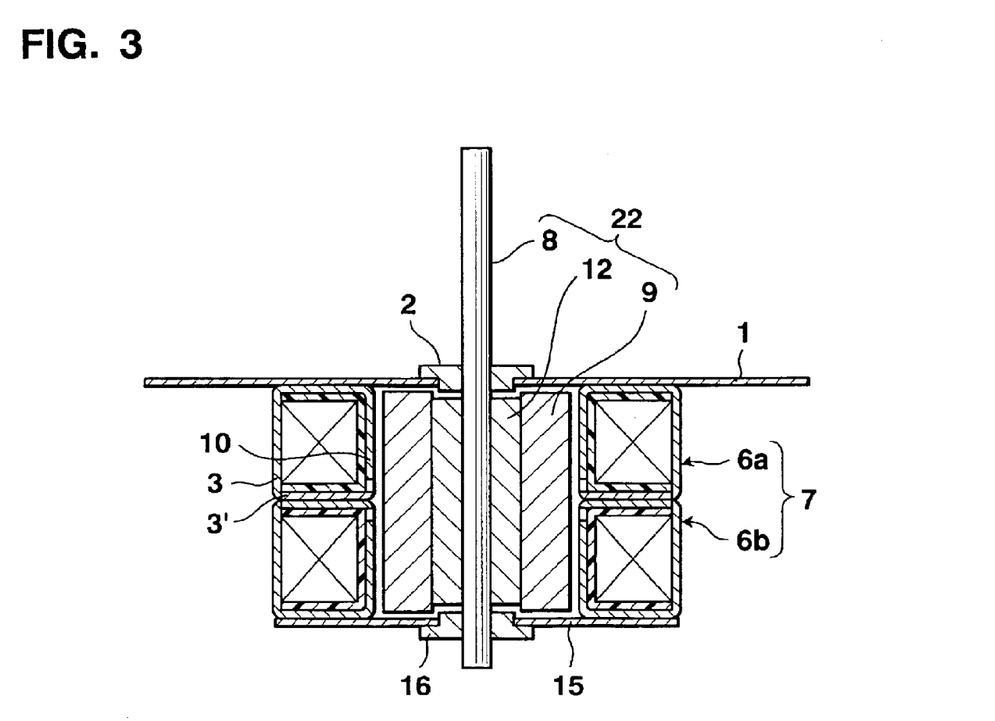
FIG. 3 is a longitudinal sectional view showing the PM stepping motor according to the present invention.
Figure 5A:
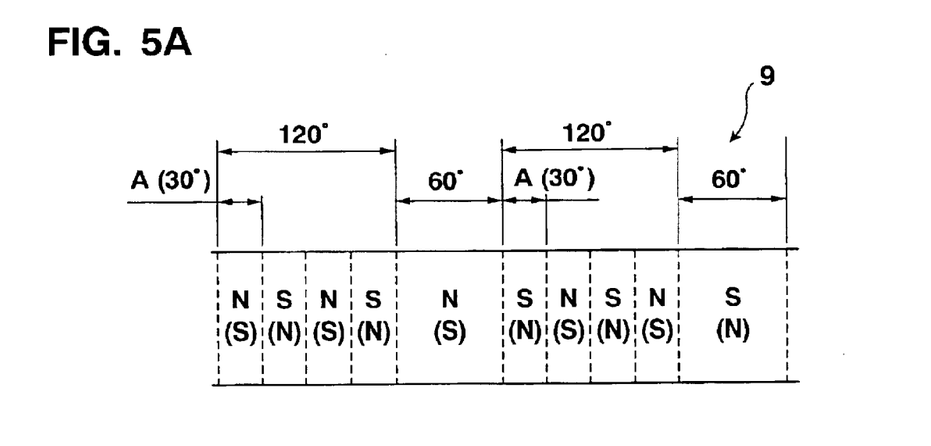
FIG. 5A is a developed view showing a magnetic pole layout for a calculated magnetic pole width of 30°.
Figure 5B:
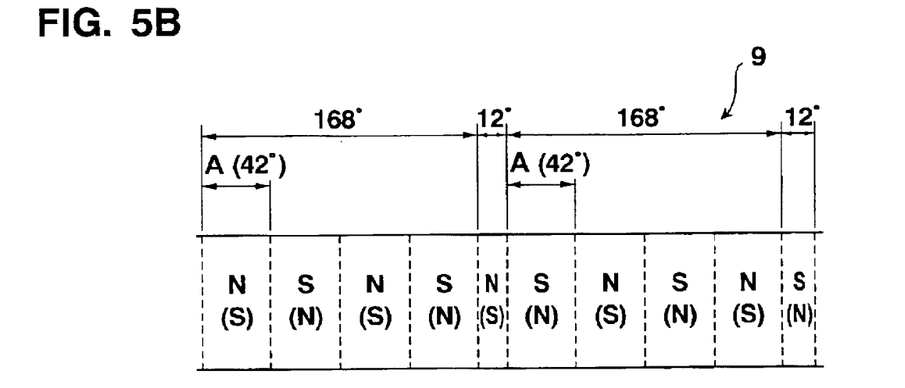
FIG. 5B is a developed view showing a magnetic pole layout for a calculated magnetic pole width of 42°.

As shown in FIG. 3, a rotor 22 is manufactured by fixing the sleeve 12 on the basis of the shaft 8 serving as the center of rotation in the first step, and next coating the circumferential surface of the sleeve 12 with adhesive, and last inserting the field rotor magnet 9 into the sleeve 12 so as to be coaxial with the shaft 8. Then, as shown in FIGS. 5A and 5B, the circumferential surface of the field rotor magnet 9 is magnetized into a predetermined pattern along the circumferential direction. The pole teeth 10 and 10' of the stator assembly 7 constituted by coupling the two stators 6a and 6b together back to back are arranged around the rotor 22 such that the pole teeth 10 and 10' are intermeshed with each other with a gap therebetween along the radial direction with respect to the magnetic poles of the magnetized field rotor magnet 9. The bearing 2 and a bearing 16 (not shown) which are made of a porous bearing metal and respectively caulked to the flanges 1 and 15 have the shaft 8 inserted therein. The rotor 22 is so adjusted as to be coaxial with a circumferential direction defined by the pole teeth 10 and 10' of the stator assembly 7. Then, the flanges 1 and 15 are respectively fixed to the stators 6a and 6b by plasma welding or the like.

Figure 4A:
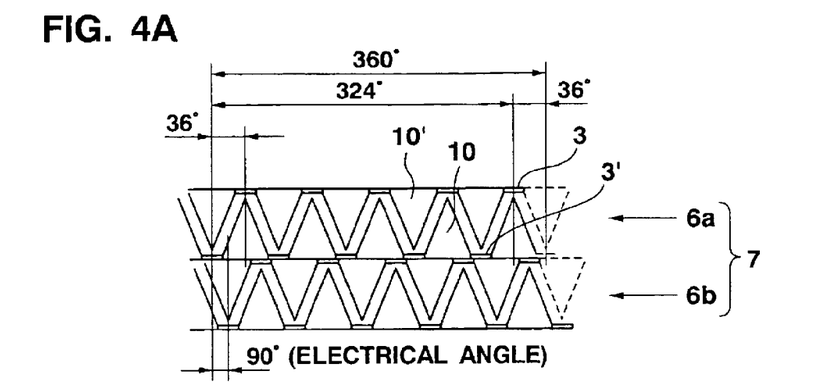
FIG. 4A is a developed view showing a 20-step stator identical to a conventional stator.
Figure 4B:
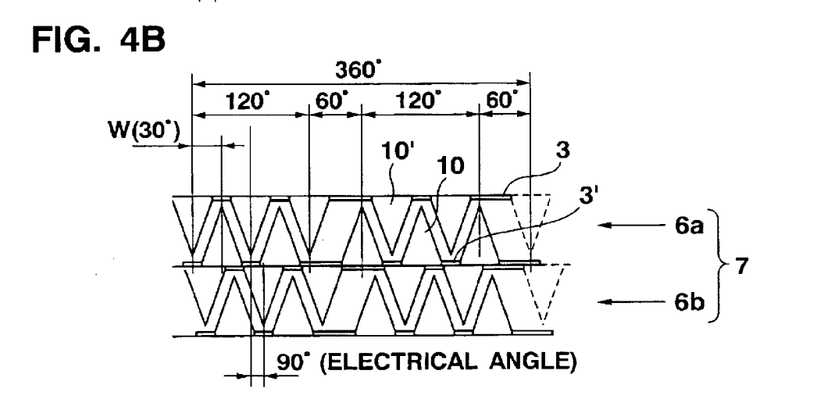
FIG. 4B is a developed view showing a stator having a pole tooth pitch of 30°.
Figure 4C:
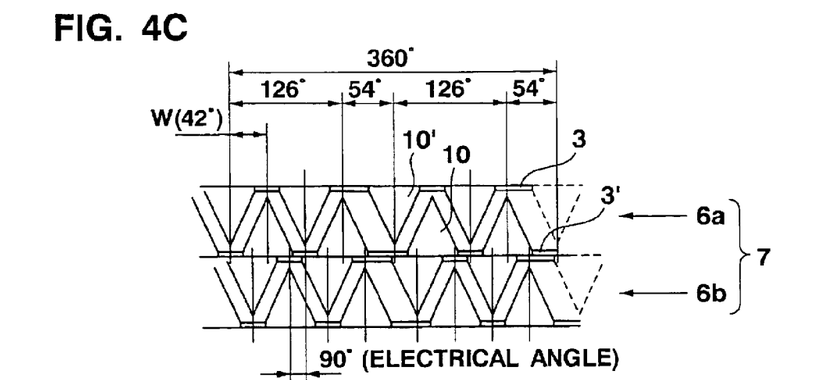
FIG. 4C is a developed view showing a stator having a pole tooth pitch of 42°.

In FIGS. 4A to 4C, the stators 6a and 6b as the most important element of the present invention are shown with developed views. FIG. 4A shows the 20-step stators 6a and 6b identical to a conventional stator having a pole tooth pitch W of 36° with 20 steps. FIG. 4B shows the stators 6a and 6b having a pole tooth pitch W of 30°. FIG. 4C shows the stators 6a and 6b having a pole tooth pitch W of 42°.

As shown in FIG. 4A, a total of ten pieces of pole teeth 10 of the stator 6a are arranged at each 36° of pitch, and each of their pitches is the same as the magnetic pole width of a conventional field rotor magnet. The stator 6b also has the same structure. In the stator assembly 7, the stators 6a and 6b are coupled together back to back so as to shift each of the pole teeth 10 and 10' at an electrical angle of 90°.

On the other hand, in the first embodiment of the present invention, the field rotor magnet 9 is divided into ten parts having an equal width in the same way as in a conventional motor, and the number P of magnetic poles is set to ten. This time, the pole tooth pitch W of the stators 6a and 6b is 30°, as shown in FIG. 4B, which is calculated by:

$$W = \{\text{One-Cycle Interval of Magnetic Poles } (360°/(P/2)) - \text{Half-Cycle Interval of Third Harmonics } (360°/(P/2) \times (1/6))\}/2$$

For obtaining the pole tooth pitch W of 30°, as shown in FIG. 4B, the number of pole teeth 10 or 10' necessary for the stator 6a or 6b is ten pieces. Five pieces of pole teeth, which are half the total number of pole teeth of the stator 6a or 6b, are each laid out at the pole tooth pitch of 30°. An adjustment pitch between two pole teeth where the former half shifts to the latter half is set to be 60°. The pole tooth layout is point-symmetrical with respect to the center of the stator.

The stator assembly 7 is constituted such that the two stators 6a and 6b with the above structure are coupled together back to back with a phase difference corresponding to an electrical angle of 90°.

On the other hand, in the second embodiment of the present invention, as shown in FIG. 4C, it is tried to divide a field rotor magnet 9 into ten parts having an equal width in the same way as in the conventional motor, and the number P of magnetic poles is set to be ten poles also. This time, the pole tooth pitch W of stators 6a and 6b is 42°, which is calculated by:

$$W = \{\text{One-Cycle Interval of Magnetic Poles } (360°/(P/2)) + \text{Half-Cycle Interval of Third Harmonics } (360°/(P/2) \times (1/6))\}/2$$

However, for obtaining the pole tooth pitch W of 42°, the number of pole teeth 10 or 10' necessary for the stator 6a or 6b cannot be set to be ten pieces, and therefore is set to be eight pieces. Four pieces of pole teeth, which are half the total number of pole teeth of the stator 6a or 6b, are each laid out at the pole tooth pitch of 42°. An adjustment pitch between two pole teeth where the former half shifts to the latter half is set to be 54°. The pole tooth layout is point-symmetrical with respect to the center of the stator.

A stator assembly 7 is constituted such that the two stators 6a and 6b with the above structure are coupled together back to back with a phase difference corresponding to an electrical angle of 90°.

In this connection, the number of pole teeth 10 or 10' of the stator 6a or 6b can also be changed. In this case, the rotational speed can be kept unchanged with high operability.

With the above structures of the rotor and stator, the pole tooth layout is shifted from the magnetic pole. Third harmonics contained in magnetic fluxes linked between the field magnet of the field rotor magnet 9 and the stator can sequentially cancel each other, greatly decreasing generation of third harmonics. As a result, the present invention can provide a high-controllability PM stepping motor reduced in cogging, vibrations, and noise.

FIGS. 5A and 5B show the magnetic pole layout of the field rotor magnet 9 in a 20-step PM stepping motor. FIG. 5A shows a magnetic pole layout when a calculated magnetic pole width "A" is set to be 30°. And, FIG. 5B shows a magnetic pole layout when a calculated magnetic pole width "A" is set to be 42°.

The stators 6a and 6b have a two-phase structure in which ten pieces of pole teeth 10 and ten pieces of pole teeth 10' (see FIGS. 4A and 4B) are arranged at an equal pitch and the two stators 6a and 6b are shifted by an electrical angle of 90°. In addition, the magnetic pole width of the field rotor magnet 9 is changed. The number of magnetic poles of the field rotor magnet 9 is ten, which is the same as in the conventional motor. Letting n be the number of pole teeth 10 or 10' of the stator 6a or 6b, each pole width "A" of the magnetic poles is 30° or 42° which is calculated by:

$$A=\{\text{One-Cycle Interval of Pole Teeth } (360°/(n/2))\pm\text{Half-Cycle Interval of Third Harmonics } (360°/(n/2)\times(\tfrac{1}{6}))\}/2$$

For obtaining the calculated magnetic pole width "A" of 30°, as shown in FIG. 5A, the necessary number of poles is ten poles. Each of the first to fourth poles has the same width of 30°, and the fifth pole width is 60° as a width adjustment portion. Each of the sixth to ninth poles has the same width of 30° again, and finally, the 10th pole width is again 60° as a width adjustment portion. In other words, one pair of N- and S-poles are used as magnetic pole width adjustment portions, and the above two poles differ in width from the remaining magnetic poles. In this manner, magnetic poles are laid out around the field rotor magnet 9 so as to be point-symmetrical with respect to the center of the field rotor magnet 9. Note that all the magnetic pole widths "A" may be set to be 30°. In this case, the number of magnetic poles is twelve, and therefore the rotational speed changes.

For obtaining the calculated magnetic pole width "A" of 42°, as shown in FIG. 5B, each of the first to fourth poles has the same width of 42°, and the fifth pole width is 12° as a width adjustment portion. Each of the sixth to ninth poles has the same width of 42° again, and finally, the 10th pole width is again 12° as a width adjustment portion. In other words, one pair of N- and S-poles are used as magnetic pole width adjustment portions, and the above two poles differ in width from the remaining magnetic poles. In this fashion, magnetic poles are laid out around the field rotor magnet 9 so as to be point-symmetrical with respect to the center of the field rotor magnet 9.

In the above description, the number of magnetic poles of the field rotor magnet 9 is the same as that of the conventional motor, but can be changed as far as the equation is satisfied. When the number of magnetic poles is changed, the rotational speed changes.

By shifting the magnetic poles from the pole teeth, as described above, third harmonics contained in magnetic fluxes linked between the stator and the field magnet can sequentially cancel each other, greatly decreasing generation of third harmonics. Accordingly, a high-controllability PM stepping motor reduced in cogging, vibrations, and noise can be constituted.

Figure 6:
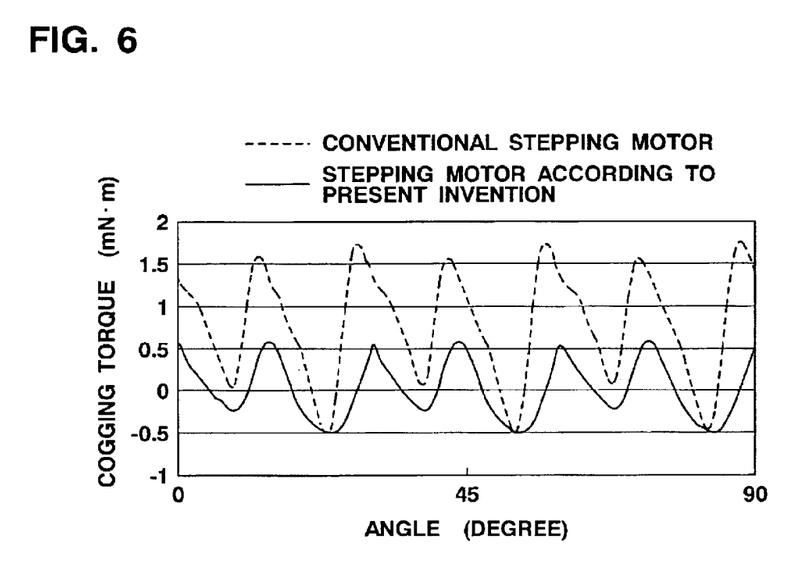
FIG. 6 is a graph showing a comparison of the cogging torque between a stepping motor according to the present invention for 24 steps per rotation and a conventional one.

FIG. 6 is a graph showing a comparison of the cogging torque between a stepping motor according to the present invention for 24 steps per rotation and a conventional one.

As shown in FIG. 6, the rotation of the stepping motor according to the present invention is smoother than that of the conventional one.

Figure 7A:
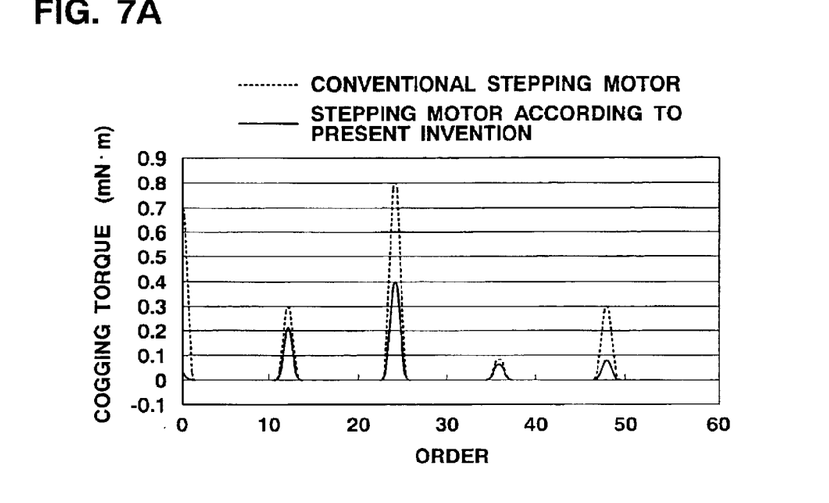
FIG. 7A is a graph showing a comparison of the FFT (Fast Fourier Transform) of the cogging torque.
Figure 7B:
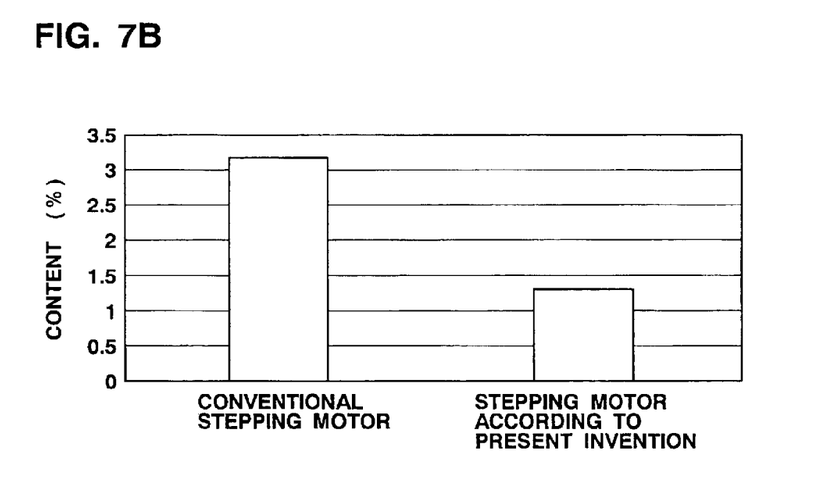
FIG. 7B is a graph showing a comparison of the third harmonic content of the back-electromotive force.

FIGS. 7A and 7B are graphs showing the cogging torque characteristics of a stepping motor according to the present invention and a conventional one. FIG. 7A is a graph showing a comparison of the FFT (Fast Fourier Transform) of the cogging torque, and FIG. 7B is a graph showing a comparison of the third harmonic content of the back-electromotive force.

As shown in FIGS. 7A and 7B, the harmonic component in the stepping motor according to the present invention is less than that in the conventional stepping motor. In particular, the component of the third harmonic involving the cogging torque is remarkably less.

Figure 8:
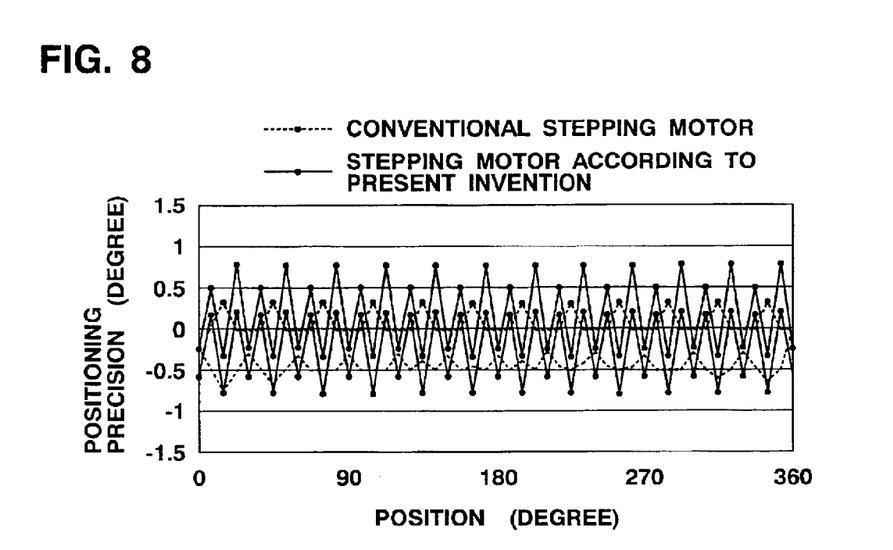
FIG. 8 is a graph showing a comparison of the angular precision (positioning precision) between a stepping motor according to the present invention and a conventional one.

FIG. 8 is a graph showing a comparison of the angular precision (positioning precision) between a stepping motor according to the present invention and a conventional one.

As shown in FIG. 8, the stepping motor according to the present invention is by no means inferior to the conventional stepping motor.

The gist of the present invention can be satisfactorily applied to an outer rotor type motor, which apparently falls within the spirit and scope of the present invention.

As has been described above, in the PM stepping motor of the present invention, the magnetic pole width of the field rotor magnet and the pole tooth pitch of the stator are so set as not to coincide with each other, and third harmonics cancel each other. The present invention can provide a low-vibration, low-noise, high-performance stepping motor with a simple structure suitable for a larger number of steps.

What is claimed is:

1. A PM stepping motor according comprising:
   a stator assembly which is configured in a two-phase structure including two stators, each having at its inner circumference a plurality of pole teeth in two arrays arranged oppositely to each other and intermeshing with each other with a gap therebetween, said two stators being coupled together back to back in such a manner that the plurality of pole teeth of one of said stators are misaligned with respect to those of the remaining stator by an electrical angle of 90 degrees; and
   a field rotor magnet arranged such that said field rotor magnet is opposite to the respective plurality of pole teeth of the stator with a small air gap therebetween, a pitch of the pole teeth for one phase being calculated by a formula:
   {A one-cycle interval of magnetic poles (360°/(p/2))± a half-cycle interval of third harmonics (360°/(p/2)×

(⅙))}/2, where p is a number of a plurality of magnetic poles, the magnetic poles having a constant width and being magnetized circumferentially on an outer surface of said field rotor magnet so as to dispose N- and S- poles alternately, and the pole teeth being arranged to be symmetrical about a center of the stator in such a manner that a pitch at two thereof opposing each other with respect to the center is different from the pitch at the other pole teeth than the two thereby performing pitch adjustment.

2. A PM stepping motor comprising:

a stator assembly which is configured in a two-phase structure including two stators, each having at its inner circumference a plurality of pole teeth in two arrays arranged oppositely to each other and intermeshing with each other with a gap therebetween, said two stators being coupled together back to back in such a manner that the plurality of pole teeth of one of said stators are misaligned with respect to those of the remaining stator by an electrical angle of 90 degrees; and a field rotor magnet arranged such that said field rotor magnet is opposite to the respective plurality of pole teeth with a small air gap therebetween, a width of a plurality of magnetic poles magnetized circumferentially on an outer surface of said field rotor magnet so as to dispose N- and S- poles alternately for one phase being calculated by a formula:

{A one-cycle interval of pole teeth (360°/(n/2))± a half-cycle interval of third harmonics (360°/(n/2)×(⅙))}/2, where n is a number of the pole teeth, the pole teeth having a constant pitch for one phase, and the magnetic poles being arranged to be symmetrical about a center of the field rotor magnet in such a manner that one pair of N- and S-poles thereof opposing each other with respect to the center have a width different from the width of the other magnetic poles than the one pair, thereby performing width adjustment.

3. A PM stepping motor comprising:

a stator assembly which is configured in a two-phase structure including two stators, each having at its inner circumference a plurality of pole teeth in two arrays arranged oppositely to each other and intermeshing with each other with a gap therebetween, said two stators being coupled together back to back in such a manner that the plurality of pole teeth of one of said stators are misaligned with respect to those of the remaining stator by an electrical angle of 90 degrees such that at least all but two of the pole teeth have at a space between the opposed pole teeth a pole tooth pitch including a half-cycle of third harmonics with any remaining pole teeth having an adjustment pitch not equal to the others; and a field rotor magnet arranged such that said field rotor magnet is opposite to the respective plurality of pole teeth with a small air gap therebetween and that a plurality of magnetic poles, N- and S- poles, magnetized circumferentially on an outer surface of said field rotor magnet are alternately disposed at a predetermined width equal to the remaining magnetic poles.

4. A motor according to claim 3, wherein the pitch of the at least all but two pole teeth for one phase is calculated by a formula:

{A one-cycle interval of magnetic poles (360°/(p/2))± a half-cycle interval of third harmonics (360°/(p/2)×(⅙))}/2, where p is a number of the magnetic poles with their width being constant, and wherein the pole teeth are arranged to be symmetrical about a center of the stator in such a manner that any pole tooth having an adjustment pitch thereof opposes the remaining pole tooth having an adjustment pitch thereof with respect to the center.

5. A motor according to claim 4, wherein the number of the magnetic poles with their width being constant is 10 and the pitch of the at least all but two pole teeth is 30 degrees.

6. A motor according to claim 4, wherein the number of the magnetic poles with their width being constant is 10 and the pitch of the at least all but two pole teeth is 42 degrees.

7. A PM stepping motor comprising:

a stator assembly which is configured in a two-phase structure including two stators, each having at its inner circumference a plurality of pole teeth in two arrays arranged oppositely to each other and intermeshing with each other with a gap therebetween, said two stators being coupled together back to back in such a manner that the plurality of pole teeth of one of said stators are misaligned with respect to those of the remaining stator by an electrical angle of 90 degrees, such that the respective plurality of pole teeth have a predetermined constant pole tooth pitch; and a field rotor magnet arranged such that said field rotor magnet is opposite to the respective plurality of pole teeth with a small air gap therebetween and that a plurality of magnetic poles, N- and S- poles, magnetized circumferentially on an outer surface of said field rotor magnet are alternately disposed at a predetermined width such that at least all but two of the magnetic poles have a magnetic pole width including a half-cycle of third harmonics with any remaining magnetic pole widths having an adjustment width not equal to the others.

8. A motor according to claim 7, wherein the width of the at least all but two magnetic poles for one phase is calculated by a formula:

{A one-cycle interval of pole teeth (360°/(n/2))± a half-cycle interval of third harmonics (360°/(n/2)×(⅙))}/2, where n is a number of the pole teeth with their pitch being constant for one phase, and wherein the magnetic poles are arranged to be symmetrical about a center of the field rotor magnet in such a manner that any of the N- and S-poles having an adjustment width thereof oppose the remaining N- and S-pole having an adjustment width thereof with respect to the center.

9. A motor according to claim 8, wherein the number of the pole teeth with their pitch being constant for one phase is 10 and the magnetic pole width of the at least all but two magnetic poles is 30 degrees.

10. A motor according to claim 8, wherein the number of the pole teeth with their pitch being constant for one phase is 10 and the magnetic pole width of the at least all but two magnetic poles is 42 degrees.

* * * * *